Jan. 23, 1945. J. A. DIEHL 2,367,818
SEADROME CONTACT LIGHT BUOY
Filed Jan. 13, 1940 5 Sheets-Sheet 1

INVENTOR
John A. Diehl

BY
Ely & Frye
ATTORNEYS

Jan. 23, 1945.  J. A. DIEHL  2,367,818
SEADROME CONTACT LIGHT BUOY
Filed Jan. 13, 1940   5 Sheets-Sheet 2

INVENTOR
John A. Diehl
BY
Ely & Frye
ATTORNEYS

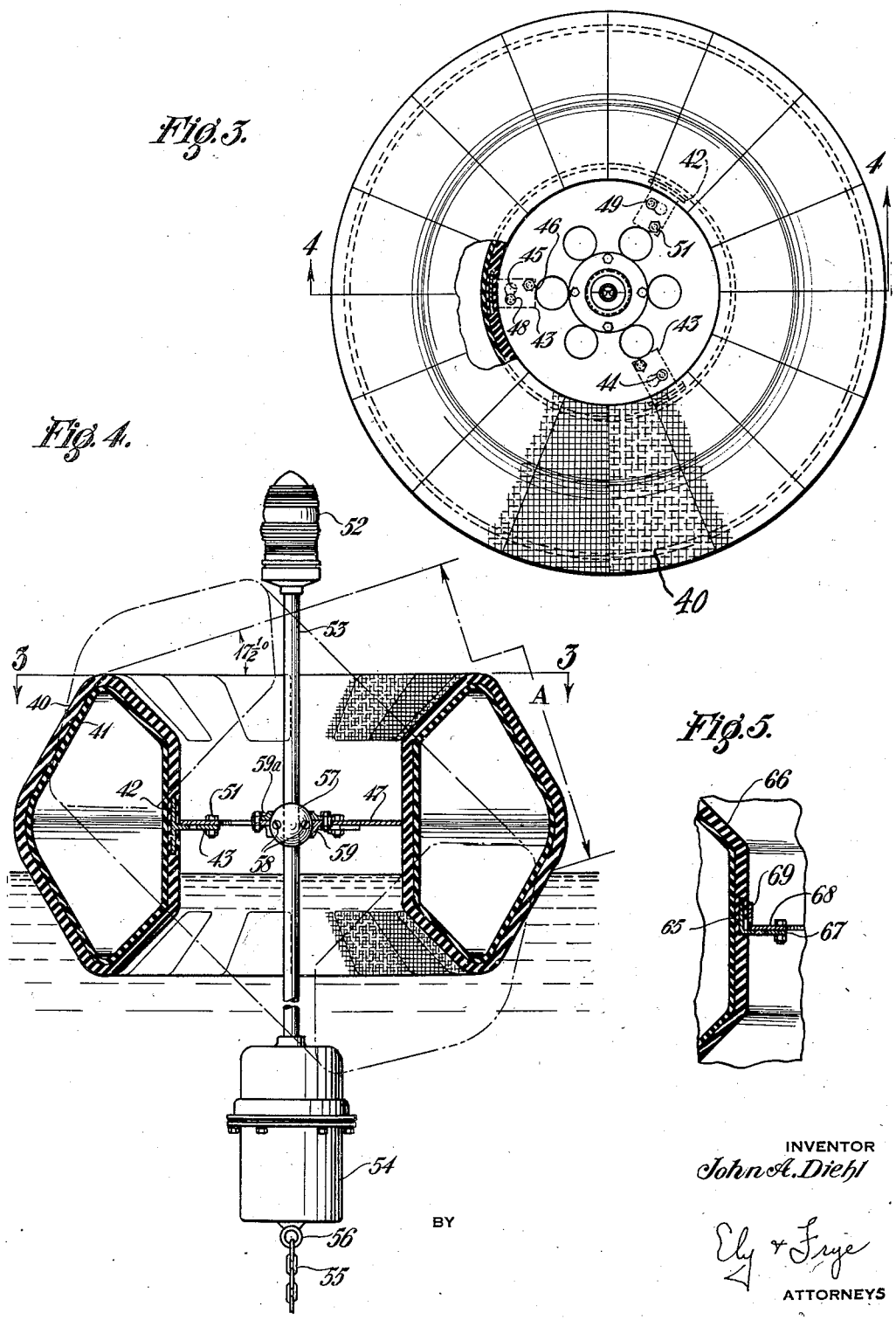

Jan. 23, 1945.  J. A. DIEHL  2,367,818
SEADROME CONTACT LIGHT BUOY
Filed Jan. 13, 1940  5 Sheets-Sheet 4

INVENTOR
John A. Diehl

BY
Ely & Frye
ATTORNEYS

Jan. 23, 1945. J. A. DIEHL 2,367,818
SEADROME CONTACT LIGHT BUOY
Filed Jan. 13, 1940 5 Sheets-Sheet 5
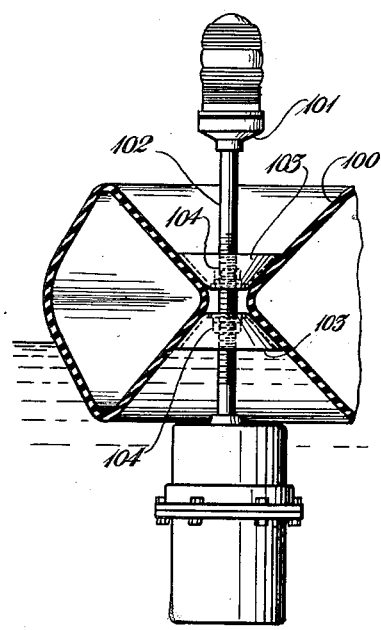
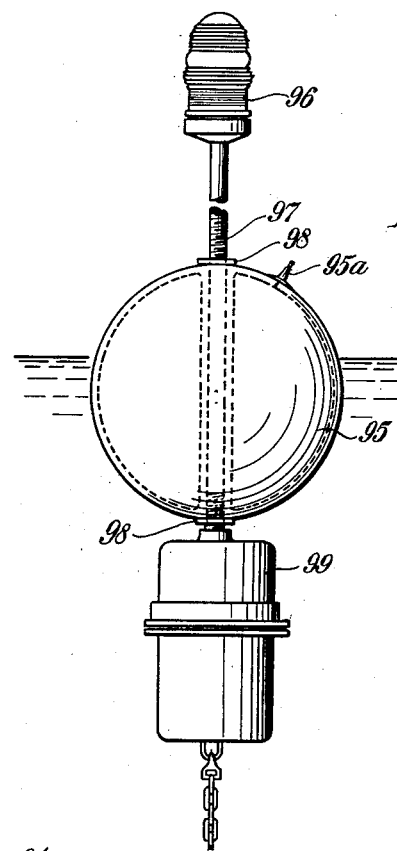
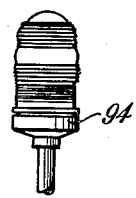
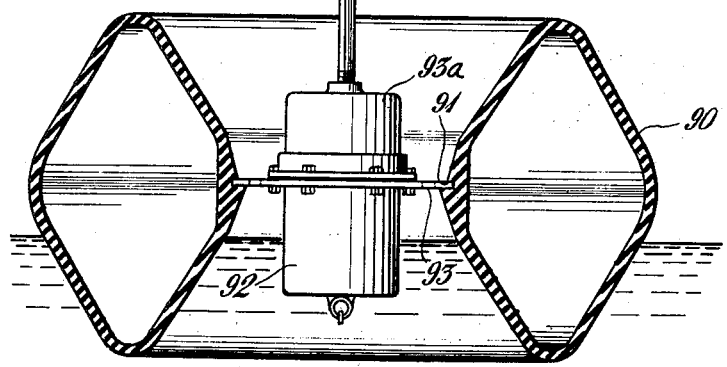
INVENTOR
John A. Diehl
BY
Ely + Frye
ATTORNEYS Patented Jan. 23, 1945

2,367,818

UNITED STATES PATENT OFFICE 2,367,818

SEADROME CONTACT LIGHT BUOY

John A. Diehl, Akron, Ohio, assignor to The Firestone Tire & Rubber Company, Akron, Ohio, a corporation of Ohio Application January 13, 1940, Serial No. 313,725

10 Claims. (Cl. 177—329)

This invention relates to light buoys, especially to those used to designate landing areas for seaplanes.

Seadrome buoys are used infrequently, and since the production of light on the buoy is expensive it usually is desired to operate the lights only when planes are landing on or taking off from the seadrome. Hence means for readily controlling the operation of the buoys must be provided. This usually requires an actual manual operation at the buoy, since they generally are self-contained lighting units having controlling switches associated therewith, which means that the buoys should be readily approachable by small control boats.

Heretofore several types of light buoys have been proposed for use in seadrome work among which are ordinary light buoys, such as are used in marking ship channels. These buoys are not suitable for seadrome use because they do not remain stationary in agitated water and because their light reflects on the water. Also they are likely to damage parts of planes coming into contact therewith and are quite expensive. Buoys also were made from floats formed from drum sections obtained by cutting a drum in half vertically and welding a flat metal sheet over the opening in the drum. The light was mounted on this float and current was supplied thereto by a submerged cable extending from shore. However, the cable for the float was frequently damaged due to the continual rocking of the float and the current carrying cable was repeatedly severed by the anchors of ships. Also, the buoy had low daylight visibility. Other types of buoys, including a buoy made from a hollow rubberized fabric ball, have been proposed but have not been satisfactory for the foregoing and other reasons.

The general object of this invention is to overcome the above and other objections to known types of light buoys for seadromes and to provide a commercially desirable seadrome light buoy.

Another object of the invention is to provide a sturdy inexpensive seadrome buoy which is readily accessible from a control boat and which will not injure parts of a seaplane contacting same.

Other objects of the invention are to provide a self-contained light buoy; to provide a buoy which is in positive engagement with the light producing means carried thereby; which will not skid over water readily; which maintains the light carried thereby in a vertical position; which a good daylight marker; and which is readily assembled.

The above and further objects will be made apparent from the following specification taken in conjunction with the accompanying drawings, in which:

Figure 3 is a sectional elevation, partly broken away, taken on line 3, 3 of the modified light buoy shown in Figure 4;

Figure 4 is a vertical sectional elevation taken on line 4, 4 of Figure 3;

Figure 5 is a sectional elevation of a modified form of anchoring means for securing the light producing member to the rubber tube;

Figures 8, 9, 10 and 11 are elevations, some partly in section, of further modifications of the invention.

The present invention, broadly speaking, resides in a light buoy made from an open-centered tube in which a light producing member is supported. The light buoy is a self-sufficient unit wherein energy supply means for a light are carried at, or below the center of the tube and are adapted to mount a light above the rubber tube.

Figure 1:
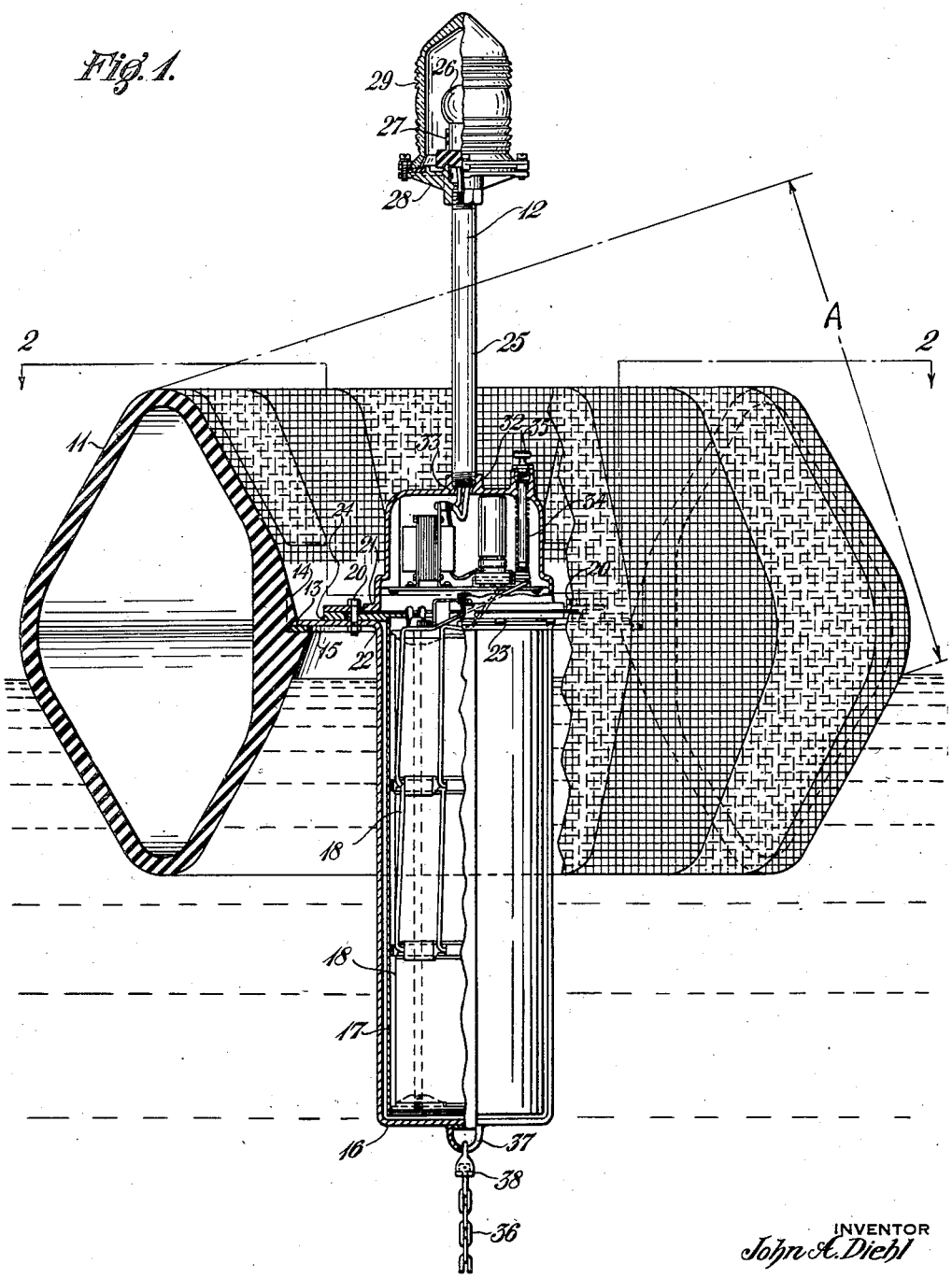
Figure 1 is an elevation, partly in section, of an improved light buoy embodying the invention.

Referring specifically to the form of the invention shown in Figure 1, it is seen that it comprises a float or tube 11, usually annular, which is substantially diamond-shaped in section and which usually is made from rubber, although in some cases it may be desired to make the tube from light gauge metal, rubberized fabric, or other suitable material, and a light producing member, generally indicated at 12, that is carried by the rubber tube 11. The rubber forming the tube 11 should be specially compounded to adapt it for continued exposure to water and sunlight. Since it is desired to place the rubber tube 11 under slight pneumatic pressure, a valve member (not shown) is provided for varying the internal pressure of same. Note that the rubber tube 11 has relatively sharply pointed ends which comprise the upper and lower parts of the tube and that only a portion of the lower part of the tube normally is submerged in water. Then the lower point of the tube acts to prevent it from skidding upon the water surface, and the light buoy of the invention is adapted to serve as an indicator in daylight due to the appreciable portion thereof which remains above water at all times. Most airplanes approach their landing fields at an angle of about 17½° with the horizontal so that the supporting tube of the invention presents the projected portion thereof indicated A to the landing pilot as he approaches same. To make this part of the buoy more visible, alternate portions of the tube are colored yellow, as shown, or, preferably, international orange and black in any suitable manner. Since the entire surface of the tube is made from rubber which may be colored black by compounded pigments, only the orange color need be applied to the tube's surface, and the final appearance of the buoy is that of alternate vertically extending orange and black stripes which gives maximum daylight visibility thereto. Of course, in certain cases it may be desirable to omit the coloring of the buoy, or other types of color indicators may be used thereon.

An annular upwardly directed integral shoulder 13 is formed on the inner periphery of the tube 11 to facilitate connecting the light producing means 12 to the rubber tube, while small integral lugs 14, spaced 90° apart from each other, are formed on the inner periphery of the rubber tube above and slightly spaced from the upper surface of the shoulder 13 for the same reason. An annular metal band 15 is carried by the shoulder 13 and the lugs 14 function as upper stops, or limiting means for the metal band 14 so that it is wedged between the lugs 14 and the shoulder 13 and firmly anchored to the rubber tube 11. The light producing means 12 is mounted upon the rubber tube by two substantially U-shaped metal straps 16, the ends of which engage with and may be secured to the metal band 15 and the center portion of which extends down around the light producing means 12. Preferably these metal straps 16 are at right angles to each other, and are aligned with the lugs 14 whereby the light producing means is uniformly supported by the rubber tube 11.

Suitable means are provided in the light producing means 12 to make same a self-contained, or self-sufficient lighting unit. In this instance there is shown a water-tight, substantially cylindrical case 17 in the lower portion of which are positioned a plurality of dry batteries 18. An upper cover 19, of substantially inverted U-shape section is provided for the case 17. This cover 19 has an outwardly directed flange 21 formed on its lower surface while the case 17 has a similar flange 22 associated with its upper surface, and bolts 23 extend through these flanges to secure same together. If desired, suitable gaskets may be inserted between the flanges 21 and 22. Locking lugs 24 may be positioned against the edges of the flanges 21 and 22, as shown, to aid in mounting the light producing means. These lugs 24 are secured in place by bolts 20 which extend through one arm of the lugs, projections formed on the flange 22, and the straps 16. An ordinary pipe 25 is secured to and extends upwardly from the upper portion of the cover 19 and carries a suitably colored electric light bulb, or light 26 at its upper end. This light 26 is mounted in any suitable manner which may include a socket 27 that is carried in a bracket 28 mounted upon the pipe 25. A protective lens 29 is placed around the light 26 to complete its assembly.

Ordinarily the light 26 should have alternating current applied thereto and for this purpose a suitable power pack unit, indicated generally by the numeral 31, is secured in leads 32 and 33 which connect the batteries 18 to the light 26. This power pack 31 changes the direct current from the batteries 18 into alternating current in a well known manner. Preferably a switch mechanism 34 which has a control button 35 extending out from the cover 19 is provided to facilitate turning the light 26 on and off, as desired. Figure 1 indicates that this switch is readily available from the outside of the buoy and that small boats could readily approach same as they would not be damaged thereby. In certain cases, remote control apparatus may be provided to operate the light 26.

An anchor chain 36 is engaged with an eyelet 37 formed on one of the straps 16 through a swivel 38 to position the light buoy and aid in maintaining it upright. This connection permits relative rotational movement of the buoy and its anchor chain which may be caused by water or air currents.

From the foregoing description it is seen that a sturdily constructed, easily assembled light buoy is provided by the invention. This buoy has a low center of gravity and normally maintains the light which it carries in a vertical position. Obviously the specific shape of the tube may be varied to any form desired and other suitable types of light producing means may be used in the practice of the invention, when desired. Note that the light producing means are spaced appreciably from the inner periphery of the tube 11 to give maximum stability to the assembled light buoy and to prevent collection of water splashed over the tube.

Referring to the embodiment of the invention shown in Figures 3 and 4, there is shown a buoy wherein means are provided for carrying the light and the energizing means therefor so that relative universal movement is permitted between same and the tubular support therefor. Here an annular pneumatic rubber tube 40 is provided with a puncture-proof lining 41 to prevent possible sinking of the light buoy on rupture of the tube 40. However, the tube of the invention is designed to float even though it has a hole therein. That is, a hole under the water line will allow only a portion of the tube to be filled with water due to the air trapped in the upper part of the tube and the tube will only sink into the water an inch or so more than normal. Then if a hole is formed in the tube above the water line, the tube may still float as it can be designed so that zero pound gage pressure therein will support it and its associated mechanism. This rubber tube 40 is vulcanized and has metallic inserts 42 which are T-shaped in section, embedded therein and vulcanized thereto. These metallic inserts 42 have apertured arms 43 extending out from the inner circumferential wall of the annular rubber tube. Figure 3 best shows that the inserts 42 are spaced from each other and are positioned uniformly around the inner circumference of the tube 40. Slots 44 having enlarged circular end portions 45 are formed in corresponding parts of the arms 43 of each of the inserts 42. Bolt receiving holes 46 are also formed in the arms 43. An apertured supporting disk 47 is received in the center of and is supported by the tube 40 and it carries small pins 48, having enlarged heads 49 offset from the surface thereof. The pins 48 are so positioned that the disk 47 may be engaged with the inserts 42 by aligning the heads 49 with the enlarged end portions of the slots 44 and inserting the head portions through the slot portions 45, thereafter rotating the disk through a slot arc. This positively engages the inserts 42 and the disk as the head portions 49 are now associated with and cannot pass through the smaller portions of the slots 44. Then bolts 51 are placed through the holes 46 in the inserts 42 and through aligning holes provided in the disk 47 to retain the disk 47 in engagement with the inserts 42.

A lamp assembly, indicated generally at 52, is mounted upon a rod, or pipe 53 which is carried by the disk 47. This pipe 53 carries a suitable energizing mechanism (not shown) at its lower end, which mechanism is contained within a water-tight case 54. Preferably, anchor means 55 are engaged with an eyelet 56 located in the lower end of the case 54.

A universal joint located between the pipe 53 and the disk 47 to allow universal movement therebetween, includes a split ball 57 that is secured to the pipe 53 by screws 58, the heads of which are received in countersunk portions of the ball 57 to prevent them from interfering with the desired universal movement. The ball 57 is received in a split socket, the lower half 59 of which is formed integrally on the disk 47 whereas the upper portion of the socket comprises a half socket member 59a which is bolted to the disk 47 by bolts 61. This enables assembling of the disk 47 in the tube 40 and then the complete assembling of the light, pipe, and energy supplying means therefor, before connecting the light mechanism to the rubber tube. This is readily done by securing the ball 57 to the proper spot on the pipe 53 and then placing the ball in the half socket 59, after which the completed socket member 59a is bolted to the disk 47 and the assembling of the light buoy is completed.

A slight modification of the metallic inserts for securing the light producing mechanism to the rubber tube is shown in Figure 5. Here right angle metallic inserts 65 are embedded in, and vulcanized to, spaced portions of a rubber tube 66 in such a manner that one arm 67 of each of the inserts 65 extends substantially radially inwardly of the rubber tube from its inner circumference. These arms 67 engage with and support a platelike member 68 which in turn supports light producing means. The member 68 has upturned flanges 69 at its periphery to aid in engaging it with the inserts 65. In some cases the arm of the insert embedded in the rubber tube wall may extend downwardly from the exposed arm on which the member 68 is supported. Furthermore, the inserts may be combined to form an annular ring having a portion embedded in the inner wall of the rubber tube and another portion etxending into the open center of the tube to support light producing mechanism.

Figure 2:
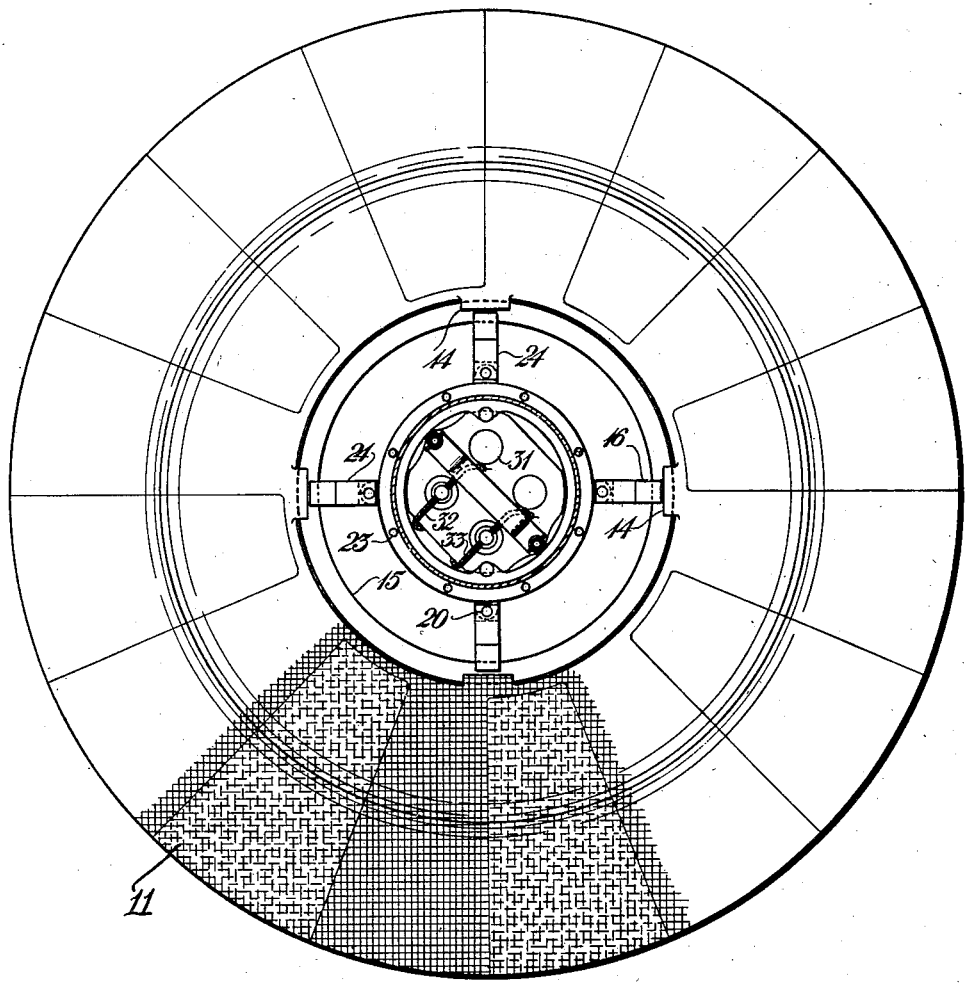
Figure 2 is a sectional elevation taken on line 2, 2 of Figure 1.
Figure 6:
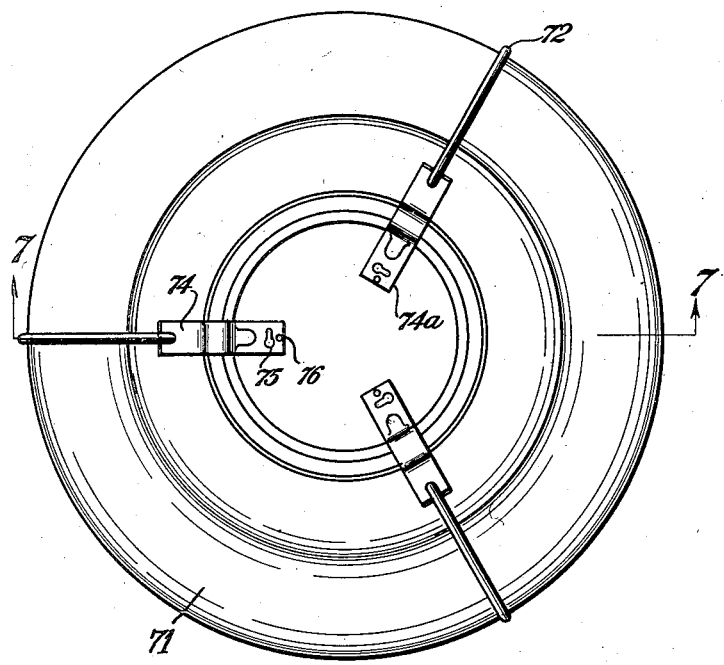
Figure 6 is an elevation of a further modification of a light buoy constructed in accordance with the invention with the light producing member being omitted.
Figure 7:
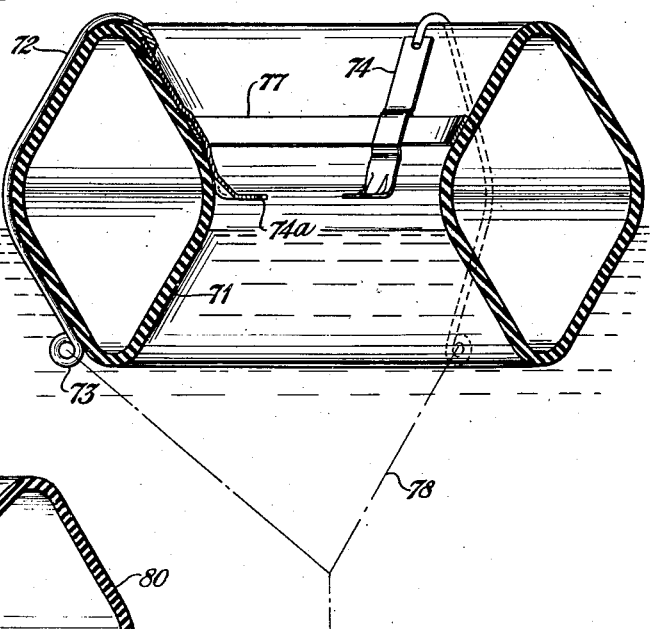
Figure 7 is a vertical sectional elevation on line 7, 7 of Figure 6.

Still another embodiment of the invention is shown in Figures 6 and 7. Said embodiment comprises a substantially diamond-shaped, in section, float or annular rubber tube 71, and hooked arms 72 engaged with the upper edges of this tube and suspended down along the outside thereof. These arms 72 conform closely to the contour of the tube and usually are substantially rigid but made from some non-metallic material so that objects contacting same will not readily be injured or scratched. These arms 72 have eyelets 73 formed in the lower ends thereof. Flat metal strips 74 are secured to the upper ends of the arms 72 in a suitable manner and extend down along the inner wall of the tube 71 to the midportion thereof. These strips 74 have inwardly extending end portions 74a that are adapted to mount suitable light producing mechanism upon the tube 71, which mechanism may be that shown in Figures 1 and 2 of the present application. To aid in securing this mechanism to the tube 41, the end portions 74a of the strips 74 have slots 75 and locking holes 76 provided in the ends thereof. An annular metal strip 77 is suitably secured to and may be integral with the flat metal strips 74 to hold them in spaced relation, as shown, and to provide additional bearing means for transferring load from the strips 74 to the tube 71. This annular strip 77 may be embedded in and/or vulcanized to the rubber tube 71, when desired. Anchor chains 78 engage with the eyelets 73 and extend to suitable anchor means (not shown).

Figure 8:
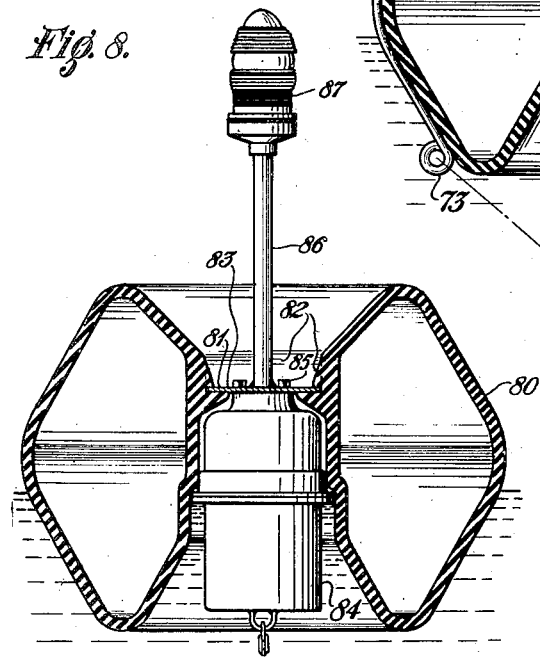

Another modification of the light buoy of the invention is illustrated in Figure 8. Here an annular rubber float, or tube 80, having a relatively small inside diameter, is provided. The tube 80 has an upwardly directed shoulder 81 formed thereon, and there are downwardly directed spaced lugs 82 integrally formed on the tube in a manner similar to that shown in Figure 1. A disk 83 is received on and supported by the shoulder 81, which disk supports suitable light producing mechanism that is enclosed in a water-tight case 84. The case 84 is secured to the disk 83 by bolts 85 and the case supports a rod 86 upon which is mounted a lamp assembly 87. The inner circumference of the tube 80 is specially designed in this modification of the invention to conform closely to the contour of the case 84 which is carried in the immediate plane of the tube 80. This is somewhat different from the other forms of the invention wherein the inner circumference of the supporting tube is spaced appreciably from the energy supplying mechanism, usually both in a radial and an axial direction, but it adapts the buoy for use in shallow water. It also is more readily portable than the other light buoys of the invention although the larger light buoys of the invention are only about four feet in diameter.

In Figure 9 there is shown a light buoy similar to that of Figure 8. This buoy comprises an annular pneumatic rubber float, or tube 90 which has an annular recess 91 formed on its inner circumference. A water tight case 92 having a flange 93 extending outwardly therefrom at its upper edge is supported by the tube 90 through the flange 93 which is engaged with the recess 91. The case 92 has a cover 93a suitably secured thereto and the cover 93a mounts a light assembly 94. Any desired energy supply means (not shown) for the lamp assembly may be carried in the case 92. Here the tube 90 is substantially symmetrical about its center line with only the lower portion, or shoulder being slightly larger than the upper portion, or shoulder of the recess 91. This buoy, which is of relatively light construction, is particularly adapted for use as a portable buoy that is readily assembled (and inflated, if desired). Note that it has no part of its light mechanism below the bottom of the tube, so that it can be used in very shallow water. Of course, this light buoy can be formed in larger sizes, when suitable.

Another embodiment of the invention wherein a ball-like rubber float, or tube 95 is utilized, is shown in Figure 10. Here a lamp assembly 96 is mounted on a threaded pipe 97 which is carried on a water-tight case 99 having energy supply means (not shown) therein for the lamp assembly 96. The threaded pipe 97 extends through the open center of the tube 95 and engages with the top and bottom thereof through threaded disks 98 which engage with the polar regions of the rubber tube which thereby supports the light producing mechanism. Suitable valve mechanism 95a is provided for varying the air pressure within tube 95.

Figure 11 shows a modified light buoy similar to that of Figure 10. Here a substantially diamond-shaped, in section, float, or tube 100 having a small open-center portion supports suitable light producing apparatus 101 which has a threaded pipe, or post 102 associated therewith. Frusto-conical clamps or washers 103 are received on the post 102 and are held in engagement with opposed portions of the tube 100 at the inner circumference thereof by nuts 104. The clamps 103 may have outwardly directed ribs formed thereon to engage with recesses formed in the tube 100 to aid in securing same together. It will be observed that the center of gravity of the buoys shown in Figures 10 and 11 may be raised or lowered by changing the position of the light producing means with relation to their supporting tubes.

From the foregoing, it is seen that the light producing means used in the novel light buoy of the invention may be either fixedly or pivotally carried by the supporting tube, but the light buoy, in all events, will retain the light at least substantially stationary even in agitated water. The width of the supporting tube for the light prevents appreciable reflection of the light from the water on which the buoy is supported. It also is seen that the supporting means for the light producing mechanism may either be integrally bonded to the rubber tube or merely carried thereon by removable means. The light buoy is readily assembled and is made from relatively inexpensive materials which give the buoy a sturdy but inexpensive construction. Under normal use, a light buoy of the invention requires servicing only about every three months.

While a written description and illustration of several embodiments of the invention are disclosed herein, it will be understood that various modifications can be made without departing from the scope of the invention as defined in the appended claims.

What is claimed is:

1. A light buoy for marking a desired spot in a body of water, said buoy comprising a vulcanized annular pneumatic rubber tube having a cylindrical inner circumference, a plurality of right angle metal inserts embedded in and vulcanized to said rubber tube, said inserts having arms extending radially inwardly from the cylindrical inner circumference of said rubber tube and having other arms extending at right angles to the exposed arms which arms are embedded in the wall of the rubber tube, an apertured metal disk secured to said inserts, a pipe extending in both directions from said metal disk, a ball and socket joint securing said pipe to said metal disk for universal movement thereon, a light carried by the upper end of said pipe, a water-tight case carried by said pipe at the lower end thereof, means for illuminating said light carried in said case, and anchor means associated with the lower portion of said case to aid in positioning said light vertically.

2. A light buoy including an annular tube of substantially diamond-shape in section with the sharp points of the diamond at the top and bottom of the tube, hooked arms which conform to the periphery of said tube engaged with the upper edge of said tube and extending downwardly over the outer surface of said tube to a point adjacent the bottom thereof, said arms having eyelets formed therein at the lower extremities thereof, metal strips secured to the inner ends of said arms and extending downwardly of said tube to the middle thereof whereat they extend radially inwardly of said tube, said radially inwardly directed portion of said metal strips being adapted to connect to light producing means, an annular metal ring carried on the upper face of said tube and secured to said metal strips to position same, and anchor means secured to said eyelets formed in said metal arms.

3. A light buoy including an annular tube, means engaged with the upper edge of said tube and extending down around said tube on both the inside and outside thereof, the portion of said means on the outside of said tube terminating in eyelets formed therein at the lower portion of said tube and the portion of said means on the inside of said tube being adapted to engage with and support light producing means, and anchor means secured to said eyelets.

4. A light buoy for positioning in a body of water to aid seaplanes in landing on or taking off from same, said light buoy comprising an annular pneumatic rubber tube having an upwardly directed shoulder formed on its inner circumference, a flat annular metal ring supported by said shoulder, a water-tight case, battery means received in said case, strap means supporting said case and engaging with and being supported by said metal ring, a light, means supporting said light upon said case and positioning same appreciably above said case, and means connecting said battery means to said light.

5. A light buoy including a pneumatic rubber tube having an upwardly directed shoulder formed on its inner circumference, light producing means, means carrying said light producing means supported on said shoulder, and downwardly directed means formed on the inner circumference of the tube above and spaced from said shoulder to aid in positioning said carrying means.

6. A light buoy comprising an annular tube, metal arms operatively associated with said tube and extending inwardly therefrom, said arms having slots formed therein which have areas of increased diameter formed in corresponding portions thereof, light producing means, and securing means associated with said light producing means for engaging same with said metal arms, said securing means having headed pins associated therewith whose heads are smaller than the areas of increased diameter of said slots and larger than the remainder of said slots, whereby said light producing means can be positioned by inserting said headed pins through said areas of increased diameter of said metal arms and then rotating said securing means to engage said headed pins with the remainder of said slots.

7. In a light buoy, an open-centered tube, an upwardly directed integral shoulder formed on the inner circumference of said tube, spaced apart downwardly directed lugs smaller than and above said shoulder formed on the inner circumference of said tube, and supporting means carried by said shoulder and held in fixed relation to said tube by being forced against said shoulder by said lugs.

8. A light buoy comprising an annular tube, a light and energy source therefor, means on the radially inner surface of said tube for supporting said light and energy source therefor, and bayonet locking lugs on said tube and said light for securing said light in said tube.

9. In a light buoy, an annular float of substantially diamond-shape in section and having four sides which meet to form two acute angles and two obtuse angles with the acute angles of the diamond being at the top and bottom of the float.

10. In a light buoy, the combination of an open centered pneumatic rubber tube which is substantially diamond shape in section, said tube having greater depth than width and having a relatively sharp lower edge to enable the tube to sink intoo the water when placed therein and trap a relatively large volume of water within the confines of the tube, a light, means for operating said light, and supporting means for said operating means fixedly secured thereto, said supporting means being fixedly engaged with only the radially inner surfaces of said rubber tube to be supported thereby, said rubber tube being appreciably larger in diameter than said light and said operating means to position same stably and being adapted to support said light and said operating means without any substantial pressure being set up in said tube whereby portions of said rubber tube can be distorted without changing the position of said light and said operating means.

JOHN A. DIEHL.

CERTIFICATE OF CORRECTION.

Patent No. 2,367,818. January 23, 1945.

JOHN A. DIEHL.

It is hereby certified that error appears in the printed specification of the above numbered patent requiring correction as follows: Page 1, second column, line 1, after "which" first occurrence, insert --is--; line 37, for "anuular" read --annular--; page 3, first column, line 4, for "slot" read --slight--; line 60, for "etxending" read --extending--; page 5, second column, line 3, claim 10, for "intoo" read --into--; and that the said Letters Patent should be read with this correction therein that the same may conform to the record of the case in the Patent Office.

Signed and sealed this 15th day of May, A. D. 1945.

(Seal)

Leslie Frazer
Acting Commissioner of Patents.